United States Patent
Murphy et al.

(10) Patent No.: US 10,224,717 B2
(45) Date of Patent: Mar. 5, 2019

(54) METHOD FOR CONTROLLING POWER DISTRIBUTION

(71) Applicant: University College Dublin, National University of Ireland, Dublin, Dublin (IE)

(72) Inventors: Conor Murphy, Dublin (IE); Andrew Keane, Dublin (IE); Peter Richardson, Dublin (IE)

(73) Assignee: Univ. College Dublin, Nat'l. Univ. of Ireland, Dublin (IE)

( * ) Notice: Subject to any disclaimer, the term of this patent is extended or adjusted under 35 U.S.C. 154(b) by 355 days.

(21) Appl. No.: 14/967,539

(22) Filed: Dec. 14, 2015

(65) Prior Publication Data

US 2016/0099566 A1 Apr. 7, 2016

Related U.S. Application Data

(63) Continuation-in-part of application No. PCT/EP2015/063213, filed on Jun. 12, 2015.

(51) Int. Cl.
| | |
|---|---|
| *H02J 3/12* | (2006.01) |
| *H02J 3/18* | (2006.01) |
| *H02J 3/50* | (2006.01) |
| *G05B 13/04* | (2006.01) |
| *G06F 17/16* | (2006.01) |

(Continued)

(52) U.S. Cl.
CPC .............. *H02J 3/12* (2013.01); *G05B 13/04* (2013.01); *G06F 17/16* (2013.01); *H02J 3/00* (2013.01); *H02J 3/18* (2013.01); *H02J 3/1885* (2013.01); *H02J 3/381* (2013.01); *H02J 3/50* (2013.01); *H02J 2003/007* (2013.01);

(Continued)

(58) Field of Classification Search
CPC ........................................................ H02J 3/50
USPC ........................................................ 700/298
See application file for complete search history.

(56) References Cited

U.S. PATENT DOCUMENTS

| | | |
|---|---|---|
| 6,188,205 B1 | 2/2001 | Tanimoto et al. |
| 2010/0237834 A1 | 9/2010 | Sadaba et al. |

(Continued)

FOREIGN PATENT DOCUMENTS

| | | | |
|---|---|---|---|
| EP | 2 799 944 A1 | 11/2014 | |
| JP | WO 2014045656 A1 * | 3/2014 | ............... H02J 3/24 |

OTHER PUBLICATIONS

Exposito, et al.; "Sensitivity-Based Reactive Power Control for Voltage Profile Improvement;" 8047b IEEE Transactions on Power Systems; No. 3, New York; Aug. 8, 1993; pp. 937-945 (9 pages).

(Continued)

*Primary Examiner* — Emilio J Saavedra
(74) *Attorney, Agent, or Firm* — Daly, Crowley, Mofford & Durkee, LLP

(57) ABSTRACT

Embodiments of the present invention produce and define a relationship between local voltage and power measurements at a node of an electrical network and system conditions on a remote branch of the network. These local measurements are used to determine an optimal voltage set point at the node that, if realized by a reactive power resource, would affect the flow of reactive power or line current at one or more particular remote branches of the power system in a manner captured by the derived relationship. The change in reactive power required to obtain this voltage set point is also calculated based on local measurements.

25 Claims, 8 Drawing Sheets

(51) Int. Cl.
*H02J 3/00* (2006.01)
*H02J 3/38* (2006.01)

(52) U.S. Cl.
CPC .............. *Y02E 40/30* (2013.01); *Y02E 40/32* (2013.01); *Y02E 60/76* (2013.01); *Y04S 40/22* (2013.01)

(56) References Cited

U.S. PATENT DOCUMENTS

| | | | | |
|---|---|---|---|---|
| 2013/0262001 A1* | 10/2013 | Sun | ............ | H02J 3/00 |
| | | | | 702/60 |
| 2015/0054339 A1* | 2/2015 | Zhao | ............ | H02J 3/16 |
| | | | | 307/24 |
| 2015/0214741 A1* | 7/2015 | Kuroda | ............ | H02J 3/24 |
| | | | | 700/298 |

OTHER PUBLICATIONS

PCT Search Report of the ISA for PCT/EP2015/063213 dated Sep. 8, 2015; 5 pages.
PCT Written Opinion of the ISA for PCT/EP2015/063213 dated Sep. 8, 2015; 6 pages.

\* cited by examiner

| Scenario | 1 | 2 | 3 | 4 | 5 | 6 | 7 | 8 |
|---|---|---|---|---|---|---|---|---|
| Node voltage | X | X | X | X | - | - | - | - |
| Power flow estimate | X | X | - | - | X | X | - | - |
| Reactive power | X | - | X | - | X | - | X | - |
| $\Delta P$ | X | - | X | - | X | X | - | - |

Figure 7

METHOD FOR CONTROLLING POWER DISTRIBUTION

CROSS REFERENCE TO RELATED APPLICATION

This application is a continuation-in-part of PCT application PCT/EP2015/063213 filed in the English language on Jun. 12, 2015, which claims priority to Great Britain application GB1411004.3 filed Jun. 20, 2014 which are hereby each incorporated by reference herein in their entireties.

FIELD

The present invention relates to a method for controlling power distribution from a plurality of power sources connected to an electrical power distribution network.

BACKGROUND

FIG. 1 shows a portion of a typical electrical power distribution network 10. The network comprises a number of branches connecting nodes indexed 00 to 08. A plurality of power sources A to D are connected to nodes 03, 05, 07 and 08 respectively and demand is drawn from the network at the nodes indicated with the arrows 12. The network 10, in this case, is fed through two transformers 14 connected in parallel. In the example shown, the power sources are indicated as being wind turbines, although it will be appreciated that the present invention is concerned with mitigating problems using any form of power resource capable of reactive power control including wind, photovoltaic, and hydro sources. Also, while the power sources are shown as individual turbines, these can equally be wind farms including a plurality of turbines or any such group of generators.

It will be appreciated that many such power sources are connected to remote portions of distribution networks where the capacity of the infrastructure connecting power sources to demand may be limited. The physical properties of the conductors and loads within the network cause both voltage magnitude and angle to vary and so cause the flow of reactive power. Any reactive source or sink can reduce the active power transfer capacity of network branches and could lead to congested power flows in the network.

The power available from sources A to D can vary largely according to prevailing environmental conditions to the extent that, under certain operating conditions, providers can be asked by network operators to curtail active power generation to avoid network congestion and breaching thermal constraints i.e. current limits for the network.

In short, there are two conflicting constraints in play, maintaining the terminal voltage of a generator at an acceptable level (to the generator) to allow generated power to be delivered and monetized while ensuring thermal constraints are not breached.

Current management schemes for generators on such distribution systems have the potential to cause the under-utilisation of existing network infrastructure, where in attempting to maintain a balanced voltage at a generator's connection node (and the surrounding network) the required reactive power may limit the available transfer capacity for active power on the surrounding lines. This in turn results in the unnecessary curtailment of active power and loss in revenue for those generators.

There have been a number of attempts to address problems with power distribution in such networks:

WO2009083445 discloses a method for increasing a total reactive power capability of a cluster of wind turbines operationally connected to a grid. The method comprises the steps of generating a voltage value representative of a grid voltage level, determining a total required reactive power value based on the voltage value, and activating at least one wind turbine in said cluster to increase the total reactive power capability from a present value to the required total reactive power value by a predetermined amount.

U.S. Pat. No. 7,531,911 and EP2254217 disclose a method of reactive power regulation in a wind farm having a plurality of wind turbines that provides optimum control of the reactive power compensation in the wind farm and is able to keep a reactive power reserve in order to support eventual grid contingencies.

U.S. Pat. No. 6,924,565 provides real and reactive power control for wind turbine generator systems where the reactive power support provided by individual wind turbine generators in a system can be dynamically varied to suit application parameters and so utilize the total capacity of a wind turbine generator system.

U.S. Pat. No. 6,924,627 discloses reactive power regulation in a wind power installation modulated by a compensation device between a generator and the network for the compensation of reactive power. The compensation device is so regulated that the electrical power delivered to the consumer has a reactive power component which is adapted in respect of its phase, amplitude and/or frequency to the consumer in such a way as to compensate for the reactive power in the consumer.

SUMMARY

According to the present invention there is provided a method for controlling power distribution according to claim 1.

The present method determines the terminal voltage of a reactive power resource to inferentially minimise current flow at one or more remote parts of a network.

Embodiments of the present invention produce and define a relationship between local voltage and power measurements at a node of an electrical network and system conditions on a remote branch of the network. These local measurements are used to determine an optimal voltage set point at the node that, if realised by a reactive power resource, would affect the flow of reactive power or line current at one or more particular remote branches of the power system in a manner captured by the derived relationship. The change in reactive power required to obtain this voltage set point is also calculated based on local measurements.

This method is not limited to controlling only generators, but any devices that inject and absorb reactive power even without producing active power.

Embodiments of the invention are based on the extent to which local measurements, at a device's connection node, can be used to infer system conditions in remote regions (branches) of the power system and make informed changes to the device's own operating point to counteract (potential) constraint breaches in those regions.

Embodiments of the invention attempt to satisfy both constraints; to uphold local terminal voltages at a node to which a device is connected to an allowable range and minimise the flow of reactive power on the surrounding network, thereby increasing the available capacity for active power to be exported from a device such as a generator site.

Embodiments employ local control, by contrast with other fit-and-forget approaches currently used in the operation of distributed generation namely; Automatic Voltage Regulation (AVR Mode) and constant Power Factor (PF Mode).

BRIEF DESCRIPTION OF THE DRAWINGS

Embodiments of the present invention will now be described, by way of example, with reference to the accompanying drawings, in which:

FIG. 7 is a table indicating various scenarios for restricting active power.

DESCRIPTION OF THE PREFERRED EMBODIMENTS

Figure 2:
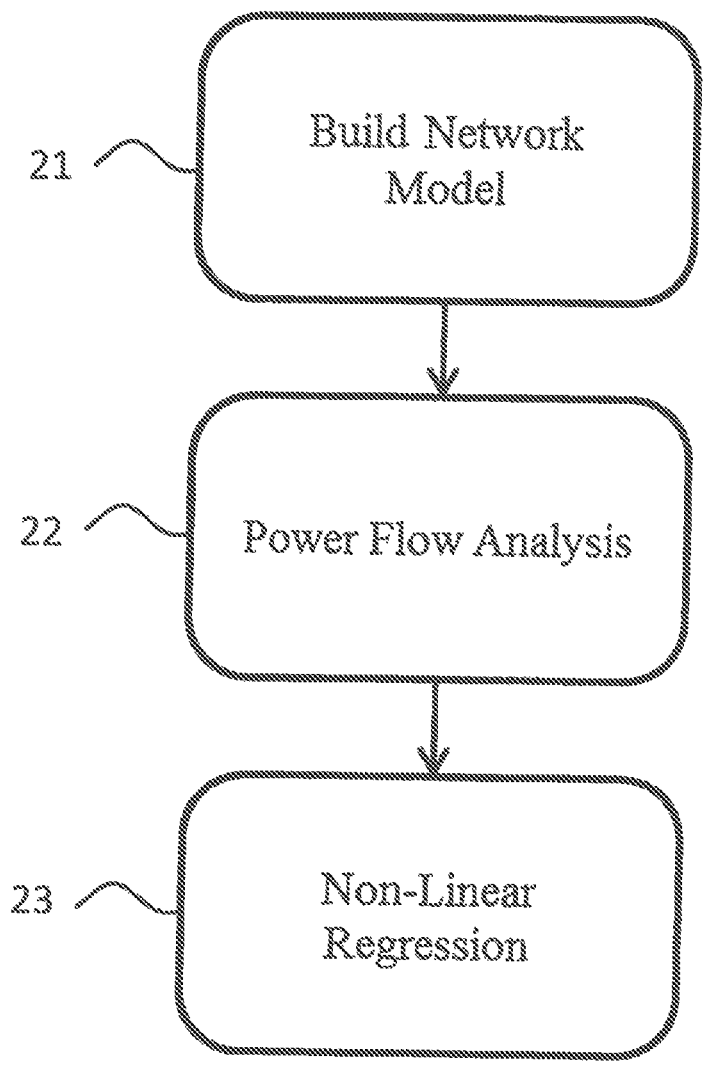
FIG. 2 illustrates generally the phases of network modelling employed within an embodiment of the invention.

Referring to FIG. 2, embodiments of the present invention first of all involve building an electrical model reflecting the electrical behaviour of a distribution network such as the network 10, step 1.

We would first of all introduce some nomenclature used in describing this modelling:
P—Active Power
Q—Reactive Power
θ—Voltage Phasor Angle
V—Voltage Phasor Magnitude
$g_{ij}$—Series Conductance for branch ij
$b_{ij}$—Series Susceptance for branch ij
$g_{si}$—Shunt Conductance at node i
$b_{si}$—Shunt Susceptance at node i
N—Total number of nodes
$|I_{ij}|$—Current Flow in branch ij $\frac{\partial P}{\partial V}$ - Active Power Voltage Sensitivity $\frac{\partial Q}{\partial V}$ - Reactive Power Voltage Sensitivity $\frac{\partial P}{\partial \theta}$ - Active Power Voltage Angle Sensitivity $\frac{\partial Q}{\partial \theta}$ - Reactive Power Voltage Angle Sensitivity Active power, $P_{ij}$, reactive power, $Q_{ij}$, and line current magnitude, $|I_{ij}|$, for each branch of the network can be defined with equations such as equations (1) to (3), although other equations could be used:

$$P_{ij} = V_i^2(g_{si} + g_{ij}) - V_i V_j(g_{ij}\cos\theta_{ij} + b_{ij}\sin\theta_{ij}) \quad (1)$$

$$Q_{ij} = -V_i^2(b_{si} + b_{ij}) - V_i V_j(g_{ij}\sin\theta_{ij} - b_{ij}\cos\theta_{ij}) \quad (2)$$

$$|I_{ij}| = \frac{\sqrt{(P_{ij})^2 + (Q_{ij})^2}}{V_i} \quad (3)$$

Calculating the complex power flow at any node i of the network involves writing two functions for all nodes N, one for active power and another for reactive power, for example, as in equations (4) and (5):

$$\Delta P_i = \sum_{j=1}^{N} \frac{\partial P_i}{\partial \theta_j}\Delta\theta_j + \sum_{j=1}^{N} \frac{\partial P_i}{\partial V_j}\Delta V_j \quad (4)$$

$$\Delta Q_i = \sum_{j=1}^{N} \frac{\partial Q_i}{\partial \theta_j}\Delta\theta_j + \sum_{j=1}^{N} \frac{\partial Q_i}{\partial V_j}\Delta V_j \quad (5)$$

In step 22, a power flow analysis, for example, Newton-Raphson power flow analysis, is undertaken to assess the impact of the generators at the various nodes of the network over the generators' range of all possible active power and reactive power operating points, at a given system demand. This analysis can be performed using a power system analysis program, such as DIgSILENT PowerFactory, and/or using a dedicated solution implemented with for example, Mathworks Matlab. Using a power system analysis program, the active power and reactive power generation of all generators are independently incremented between the bounds of their respective limits, capturing all combinations of complex power injection, and the calculated voltage magnitude and angle for every node are recorded for each combination. These node results can then be used, for example, in a Matlab script to back calculate a Jacobian matrix including every converged power flow.

Thus, the voltage and phase v and θ at every node i of the network for every combination of active and reactive power being generated by the network generators, in this case A to D, at a given demand being drawn from nodes 12 is calculated. In the embodiment, this demand is a minimum system demand at each of the nodes 12. These demand values can be set to P=Q=0 at each of the nodes 12; or they can comprise individual estimates for P and Q based on actual historical and/or predicted values.

In the embodiment, the power flow analysis captures the independent variables associated with changes in active and reactive generator power injections affecting the voltage angle and magnitude in a Jacobian matrix. The Jacobian matrix is formed by taking the coefficients of voltage angle and magnitude and writing equations (4) and (5) in matrix notation as follows:

$$\begin{bmatrix} \Delta P_1 \\ \Delta Q_1 \\ \vdots \\ \Delta P_i \\ \Delta Q_i \end{bmatrix} = \begin{bmatrix} \frac{\partial P_1}{\partial \theta_1} & \frac{\partial P_1}{\partial V_1} & \cdots \\ \frac{\partial Q_1}{\partial \theta_1} & \frac{\partial Q_1}{\partial V_1} & \cdots \\ \vdots & \vdots & \vdots \end{bmatrix} \cdot \begin{bmatrix} \Delta\theta_1 \\ \Delta V_1 \\ \vdots \\ \Delta\theta_j \\ \Delta V_j \end{bmatrix} \quad (6)$$

This Jacobian matrix encapsulates the properties of the power system and reflects the changes in voltage angle θ and magnitude V that occur at a given network node i due to the injection of active and reactive power at any network node to which a generator is connected.

The information captured in the Jacobian matrix are the node sensitivities of a converged power flow solution, although some of these may be null, reflecting, for example, where a generator might not have any effect on a remote branch of the network.

In step 23 of FIG. 2, a nonlinear regression technique is applied to the results from step 2 to derive a relationship between local measurements of V, P and Q at each generator node and remote system conditions, either $|I_{ij}|$ or $Q_{ij}$ for each branch of the network where thermal constraints are of concern. In the present embodiment, the three expressions employed to minimise the flow of reactive power on remote lines are formulated as follows:

the flow of line current or reactive power (reactive power including a current component) on a remote line of concern to a local generator:

$$|I_{ij}| \text{ or } Q_{ij} = x_1 + x_2 V^2 + x_3 P^2 + x_4 V + x_5 P + x_6 PV \qquad (8)$$

the local voltage magnitude at minimum system demand:

$$V^{MinD} = y_1 + y_2 Q^2 + y_3 P^2 + y_4 Q + y_5 P + y_6 PQ \qquad (9)$$

the local reactive power voltage sensitivity:

$$\frac{\partial Q}{\partial V} = z_1 + z_2 V^2 + z_3 Q^2 + z_4 V + z_5 V + z_5 Q + z_6 QV \qquad (10)$$

It will be seen that each of equations (8) to (10) comprises a second order expression relating two local measurements from V, P and Q at the generator node, to a parameter on the network calculated from the power flow analysis, e.g. line current $|I_{ij}|$ or reactive power flow $Q_{ij}$ on a branch of the power system. However other orders can be used and a greater number of independent variables, for example, measured values for adjacent generators, could also be chosen to extend this technique. Equally, the expressions need not be continuously valued functions and could possibly be non-linear.

It should be noted that any generator of the network could be concerned with its impact on more than one branch and in this case, a plurality of vectors x, each associated with a respective branch ij, would be calculated for that generator.

It should also be appreciated that if the status of the line was communicated to the controller this would improve the estimate for branch flow calculated from equation (8).

The vectors x, y and z in equations (8) to (10) are the coefficients determined from the regression analysis. The local measurements that are used for equation (8) are the active power, P, and the voltage magnitude, V, obtained from measurements at the location of the generator, equation (8). To calculate the voltage at a generator node at minimum system demand, the active power, P, and reactive power, Q measurements are used in equation (9). Lastly to infer the local reactive power voltage sensitivity, the measured local voltage, V, and reactive power, Q of the generator are used in equation (10).

Formulated this way, equations (8) to (10) provide for an indirect method of determining the optimal solution to the reactive power management problem for distribution systems with distributed generation, where the local voltage magnitude V and active and reactive power generation P and Q measured in real-time, are used to infer system conditions.

Figure 3:
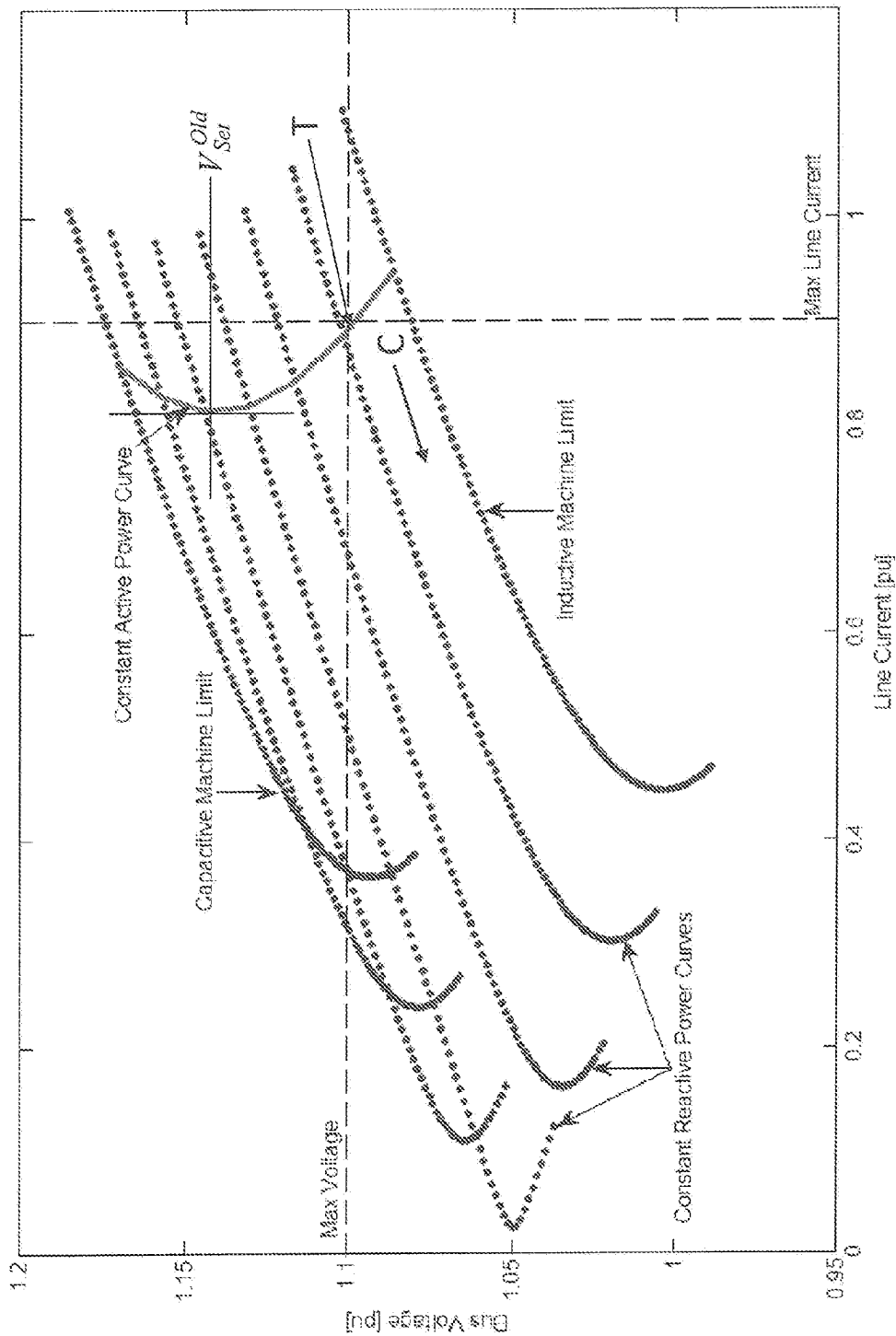
FIG. 3 illustrates conflicting constraints for a given generator within a network such as shown in FIG. 1.

FIG. 3 shows a typical illustration of two conflicting constraints for a given generator; the local voltage at a generator node i and line current of a remote branch of the system affected by the generator, as the active and reactive power of the unit vary. Thus, in the example, of FIG. 1, the controlled node could be node 08 to which generator D is connected and the branch of concern may be the branch connecting nodes 01 and 07 and/or nodes 07 and 08. (This choice of branch of concern is typically not arbitrary, as for example, generator D would not be regarded as affecting line current in the branch connecting nodes 02 and 03.)

Figure 1:
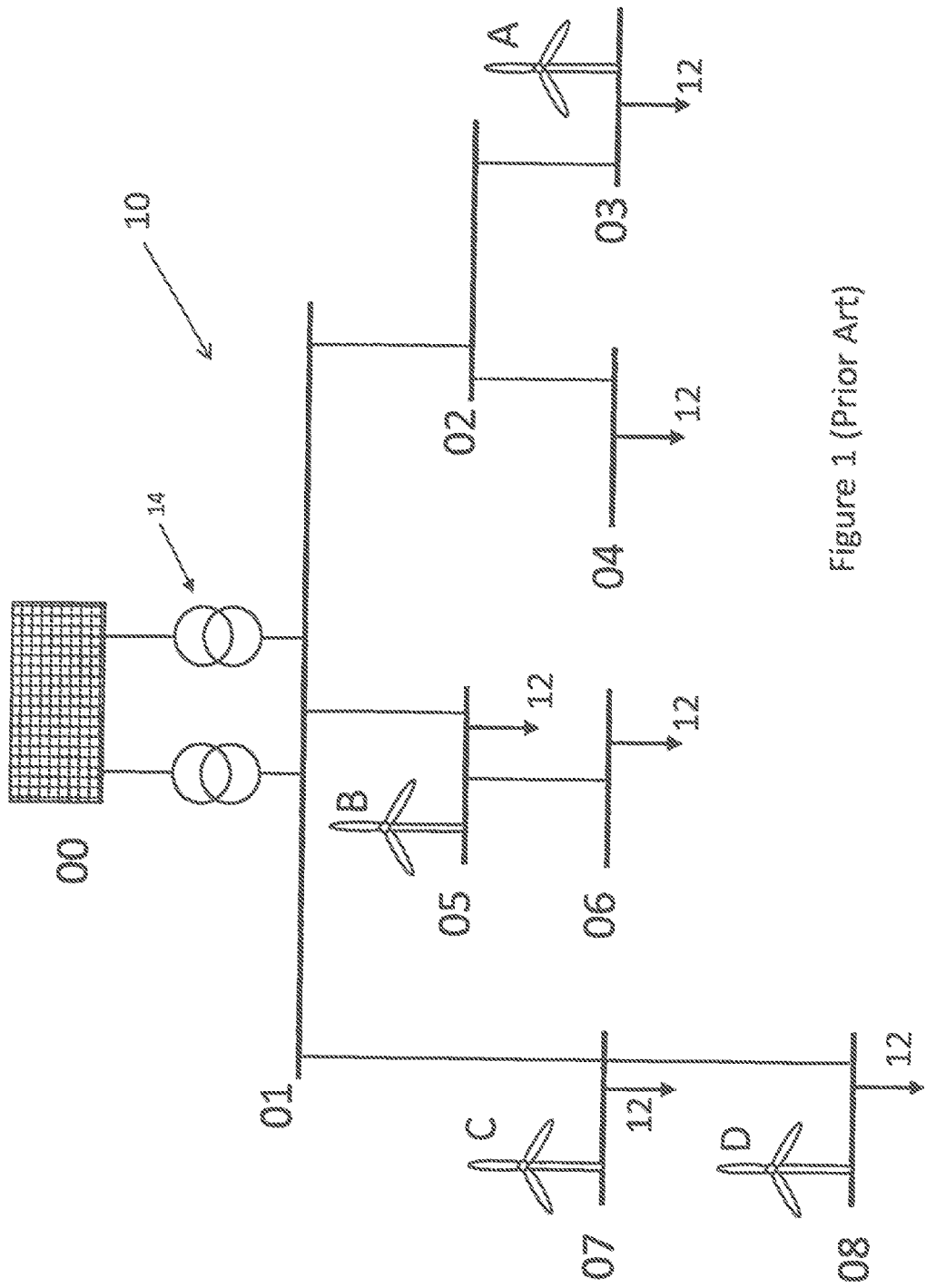
FIG. 1 shows an exemplary power distribution network including a number of renewable power sources controlled according to an embodiment of the present invention.

Other assignments within the network of FIG. 1 include the branch connecting nodes 01 and 02 being the branch of concern for generator A, branch 01-05 being the branch of concern for generator B, and branch 01-07 being the branch of concern for generator C.

FIG. 3 highlights the available choice of reactive power in the solution space available to the generator, if the active power is assumed fixed, as indicated by the constant active power curve. The typical protocol for a system operator if a thermal constraint breach is detected on a line such as this, i.e. if the maximum line current for the remote branch of concern is (to be) exceeded, has been to request a reduction in the active power produced by the generator. This curtailment of power generation has the effect of moving the constant active power curve in the direction of the arrow C. However, as will be seen, this can involve a substantial curtailment of power generation to bring the generator operator point to a level where maximum line current is not exceeded.

Figure 4:
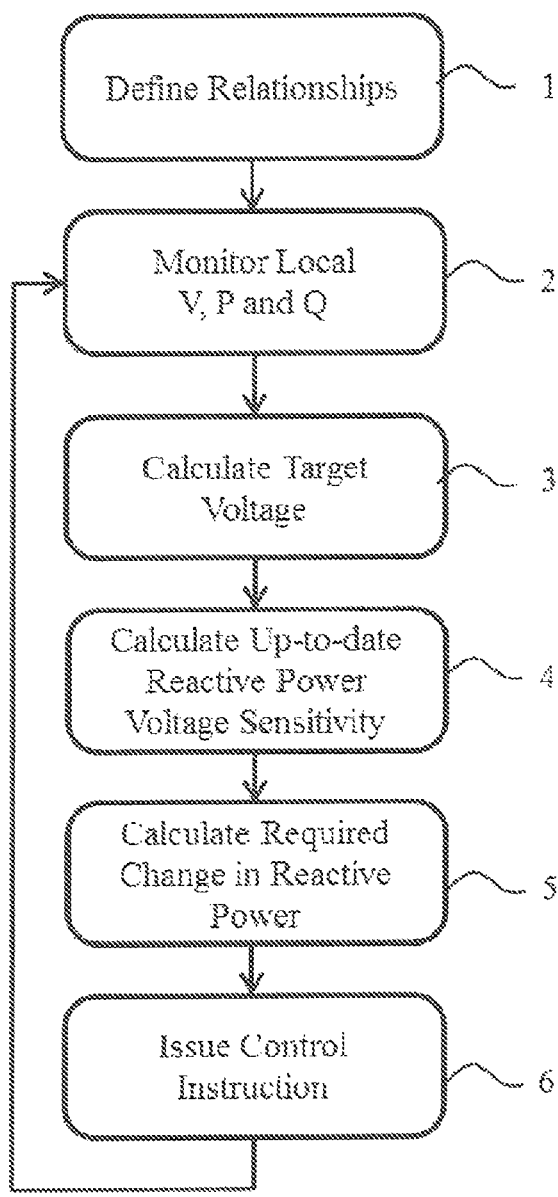
FIG. 4 illustrates the steps involved in controlling a generator in accordance with an embodiment of the invention.

FIG. 4 shows the sequential steps involved in the control of a generator according to an embodiment of the invention. Step 1 comprises the modelling and regression analysis described in relation to FIG. 2.

In Step 2 of FIG. 4, a controller (not shown) with access to equations (8) to (10) described above takes local measurements at a generator's terminals; voltage magnitude, V, active power, P, and reactive power generation, Q. Measurement can comprise continuous or periodic monitoring, for example, at 15 minute intervals, or indeed can be event driven for example in response to changes in demand or active power generation.

The controller can either comprise a centrally located controller in communication with each generator and provided with the equations for each generator; or alternatively independent controllers could operate at each generator with only knowledge of the equations (8) to (10) for that generator.

Based on the local measurements of V, P and Q in Step 3, the controller calculates a target voltage $V_{Set}^{New}$ which will result in the minimal flow of current $|I_{ij}|$ or reactive power flow $Q_{ij}$ on a branch ij in the surrounding network.

In one embodiment, an optimal solution is obtained by first determining a local voltage set point, $V_{Set}^{Old}$, from Equation (8) that results in the minimal current flow $|I_{ij}|$ and, by extension, the calculated negation of reactive power flow, in the target branch. Taking equation (8), which describes the current flow of a branch on the power system, the minimum is found by substituting the observed value of the measured independent variables, e.g. active power generation P, and differentiating with respect to the control variable, e.g. the voltage, V, at the terminals of the generator. The resulting expression of the gradient is set to zero and solved for the unknown control variable. Graphically, this corresponds to locating $V_{Set}^{Old}$ shown in FIG. 3.

As an alternative, equation (8) can be used to equate to the reactive power flow $Q_{ij}$ of a remote line. In this case, as the values are not absolute, the roots of the equation are found by substituting for the measured independent variables, e.g.

active power P. The value of this root will reveal the set point of the independent control variable, e.g. voltage magnitude, $V_{Set}^{Old}$, which will in turn result in the predicted nullification of reactive power flow on a branch$_{ij}$ on the power system.

Recall that these methods rely on the assumption that the offline power flow analysis is undertaken for minimum system demand and, as such, the determined optimal set point for the voltage, $V_{Set}^{Old}$, is only optimal in the case of minimum demand. This simplification needs to be addressed as, in reality, system demand varies daily and seasonally on a power system.

Figure 5:
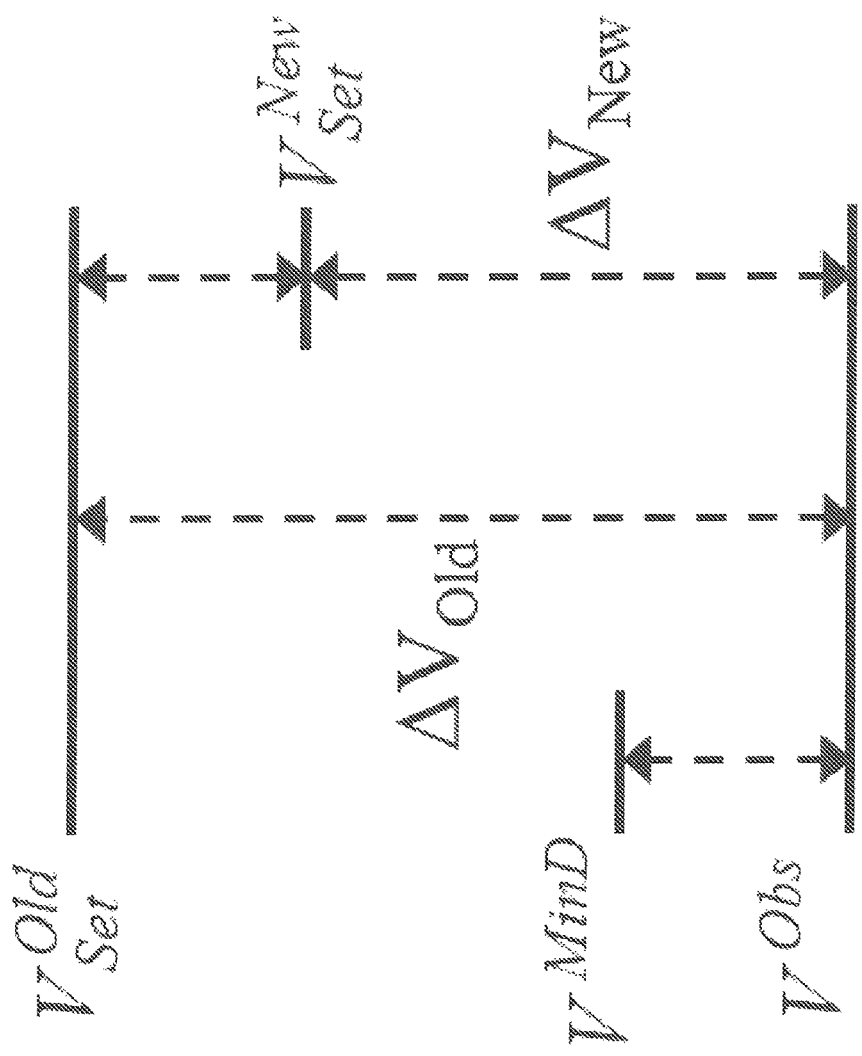
FIG. 5 shows the method for determining an adjusted voltage set point according to an embodiment of the invention.

FIG. 5 illustrates the process of adjusting $V_{Set}^{Old}$ calculated based on equation (8) to determine the target voltage $V_{Set}^{New}$ while accounting for the increase in system demand.

As shown, using the voltage set point, $V_{Set}^{Old}$ outside the time of minimum demand, where the measured voltage at the node is $V^{Obs}$, would require the injection of more reactive power than is necessary at minimum demand where the voltage, as calculated from Equation (9), is modelled as $V^{MinD}$. This is due to the fact that the measured voltage magnitude, $V=V^{Obs}$, is lessened due to the increased active and reactive load drawn at above minimum demand. The adjustment of the target voltage $V_{set}^{Old}$ calculated using equation (8) is given by:

$$V_{Set}^{New} = V_{Set}^{Old} - (V^{MinD} - V^{Obs}) \quad (11)$$

where $V^{MinD}$ is the solution to Equation (9), the calculated voltage based on observed P and Q measurements of the generator at minimum system demand.

Thus, as shown in FIG. 5, the required change in voltage, $\Delta V_{New}$, is found from the difference between the observed voltage $V=V^{Obs}$, from Step 2, and the adjusted target voltage set point $V_{Set}^{New}$.

In the present embodiment, the controller checks that the target voltage set point $V_{Set}^{New}$ required by the optimal solution is within the bounds permitted by the system operator, as in Equation (12):

$$V^- \leq V^{Obs} + \Delta V_{New} \leq V^+ \quad (12)$$

In the event that the addition of $\Delta V_{New}$ exceeds the imposed bounds, the required change in voltage is adjusted (typically reduced) by the necessary amount to ensure that the limits $V^-$, $V^+$ are adhered to.

It will be appreciated that where equation (9) is modelled based on a given demand other than minimum demand e.g. maximum demand, then the adjustment of $V_{Set}^{Old}$ to arrive at $V_{Set}^{New}$ would need to be altered accordingly.

Step 4 of FIG. 4 calculates the up-to-date reactive power voltage sensitivity $$\frac{\partial Q}{\partial V}$$

of the location of the generator. This local sensitivity is calculated by substituting the measured values V, Q from Step 2 of FIG. 4 into Equation (10).

Step 5 of FIG. 4, determines the change in reactive power generation required by the generator to obtain the required voltage set point $V_{Set}^{New}$ at its terminals. Using the sensitivity $$\frac{\partial Q}{\partial V}$$

found from Step 4, the required change in voltage $\Delta V_{New}$ determined from Step 3, equation (13) is used to get the required change in reactive power needed at the measurement location (the generator node):

$$\Delta Q = \frac{\partial Q}{\partial V} \cdot \Delta V_{New} \quad (13)$$

To ensure the required change in reactive power is contained to the reactive power limitations of the generator, the following inequality constraint is adhered to:

$$Q^- \leq Q^{Obs} + \Delta Q \leq Q^+ \quad (14)$$

The upper and lower bounds of equation (14), can also be set to a limit imposed by the system operator if a power factor or PQ range is required. In the event of the change in reactive power breaching the bounds $Q^-$ and $Q^+$, the change in reactive power is adjusted to bring the realised reactive power output to that bound. This control instruction is issued to the existing generator control system, Step 6.

It should also be appreciated that where a generator is concerned with conditions at more than one network branch, Steps 3-5 of FIG. 4 can be repeated based on each vector x (used in equation (8)) to provide alternative solutions for the required change in reactive power $\Delta Q$. In one embodiment, the largest calculated permitted change in reactive power would be chosen.

Should the generator be operating at its reactive power limit or voltage limit and the operating conditions suggest that the assigned branch (or branches) is in breach of its thermal limit, an instruction to reduce the active power generation by the required amount could be given. Formulating the active power voltage sensitivities to the local measurement set would then be useful.

On adjusting the reactive power of the generator by the required amount $\Delta Q$, the procedure from Step 2-Step 5 is then repeated and can be followed indefinitely.

Figure 6:
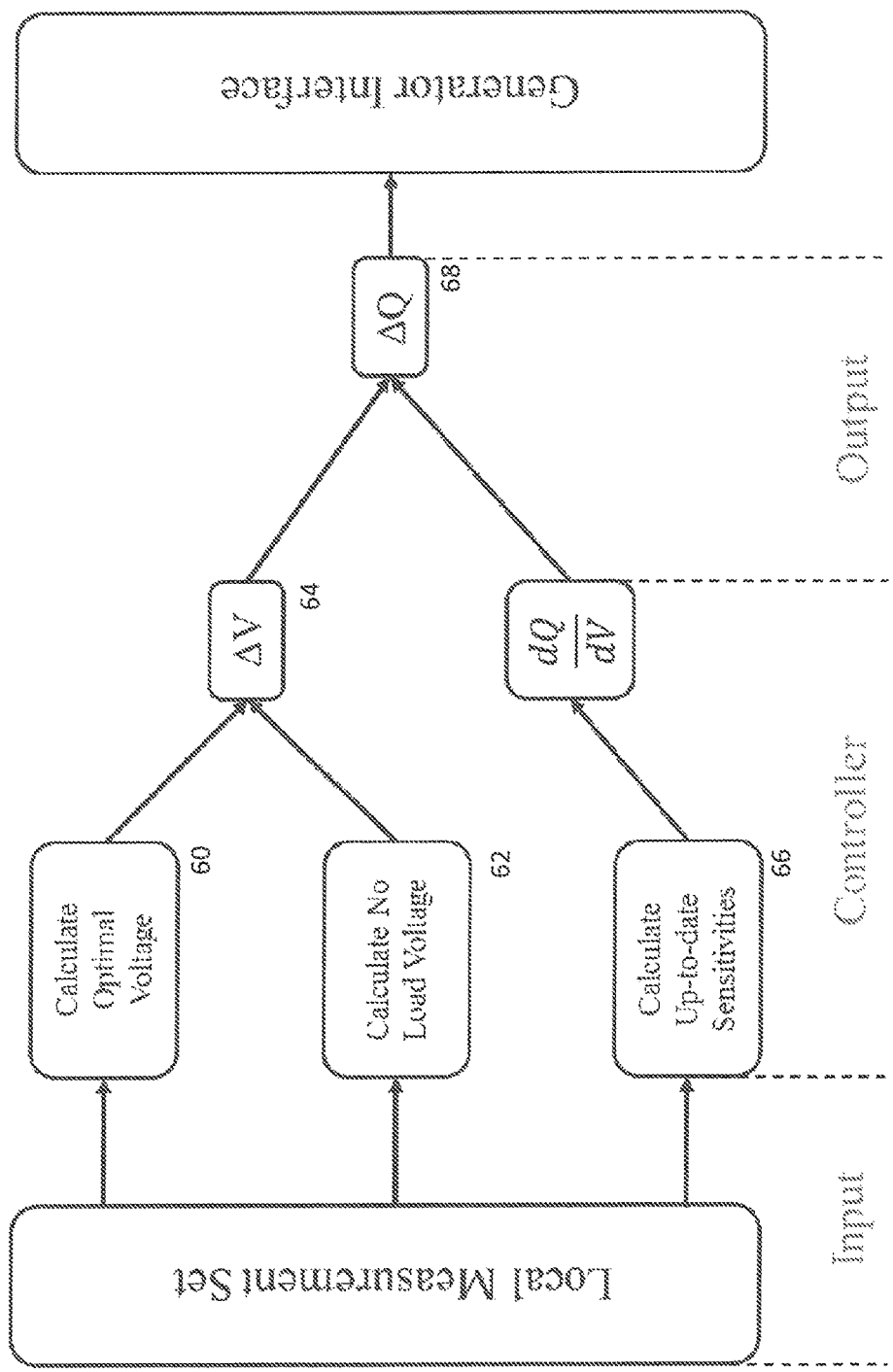
FIG. 6 shows the combinations of calculations employed in the method of FIG. 4.

A summary of the procedure to obtain the control signal $\Delta Q$ from these local inputs V, P and Q is provided in FIG. 6. So, in step 60, equation (8) is used to calculated an optimal voltage $V_{Set}^{Old}$. In step 62, equation (9) is used to calculate the expected voltage at a generator node at minimum demand $V^{MinD}$. In step 64, these values are combined with the observed voltage at the node $V=V^{Obs}$ and checked against system bounds to produce a required voltage change $\Delta V_{New}$ as illustrated in FIG. 5. Separately and either in parallel or sequentially, equation (10) is used to determine voltage sensitivity $$\frac{\partial Q}{\partial V}$$

at the node. In step 68, these values are combined and checked against system bounds to provide a required change in reactive power $\Delta Q$ and this is communicated by the controller to the generator.

Referring back to FIG. 3, the command to change reactive power has the effect of nominally shifting a generator operating point along the constant active power curve and as will be appreciated, this can provide a solution which enables a generator to adhere to thermal constraints without necessarily curtailing its active power generation. So for example, the method could help to find the operating point T, rather than shifting the operating point in the direction of the arrow C.

The first embodiment described above uses local measurements (P,V,Q) at the point of connection of a generator (A,B,C,D) to a network to infer remote system conditions ($Q_{ij}$) and calculate an optimal mode of operation to maximise energy export and reduce energy losses on a remote section of network. This ensures the local voltage limit ($V^+$) at the point of connection of the generator is adhered to while simultaneously minimising current flow of the connected network without requiring any form of communication between generators. Less current will flow, which ultimately reduces the energy losses on network branches while actually maximising the active power generated by providers. The first embodiment ensures the minimal flow of reactive power is present on the surrounding branches connecting a generator node to the network and fully utilises the reactive power of a generator to accommodate the voltage rise effect from active power generation.

However, as indicated above, operating conditions may still be such that adjustment of reactive power alone may not be sufficient to enable a generator to adhere to thermal constraints and so some reduction in active power generation may be required.

Whereas the first embodiment looked to minimise the flow of reactive power on a remote branch, a second embodiment of the invention described in more detail below maximises the flow of active power on a remote branch of the distribution system and, as a by-product, the reactive power flow is minimised.

Similar to methodology of the first embodiment, upholding the remote thermal limit and local voltage limit should be done by first calling upon the reactive power of the generator. Active power curtailment should be the last resort of a controller.

Referring to FIG. 7 where the cells designated X identify the scenarios where curtailing active power is needed to some degree:

Scenario 1: A generator at its (inductive) reactive power limit, the voltage limit is breached and there is excess flow on the remote branch.

Scenario 2: A generator with voltage limit breach and excess flow on remote branch has been estimated, reactive power resource available to potentially alleviate both.

Scenario 3: A generator at its (inductive) reactive power limit and the voltage limit is breached, no complex power flow breach estimated, active power needed to be curtailed.

Scenario 4: A generator at an upper voltage limit, no flow constraint breach estimated, reactive power available to potentially alleviate voltage constraint.

Scenario 5: A generator at its (inductive) reactive power limit and the complex power rating of a branch is estimated to be reached; curtailment of active power is needed.

Scenario 6: A remote branch has reached its complex power rating despite no voltage limit breach and the limits of reactive power are not met. Curtailment of active power is needed.

Scenario 7: A generator at its (inductive) reactive power limit, no constraint breach in play.

Scenario 8: No constraint breach detected and reactive power resource available.

Failure to mitigate the breaches in Scenario 2 or 4 by using the reactive power resources may lead to the curtailment of active power. In Scenario 7 with a further increase in active power generation, the local voltage limit or the complex flow limit could be breached. Only in Scenario 1, 3, 5 or 6 should active power curtailment be considered.

The second embodiment identifies which of the above scenarios is to be solved so as all constraint conditions can be satisfied.

In the second embodiment, one further formulation is required via-a-vis the approach of the first embodiment; this is a formulation for the active power flow ($P_{ij}$) on a remote branch, modelled as per equation (15) below as a function of values P and V and coefficients $w_1 \ldots w_6$:

$$P_{ij}=w_1+w_2V^2+w_3P^2+w_4V+w_5P+w_6VP \quad (15)$$

The coefficients $w_1 \ldots w_6$ for $P_{ij}$ can be calculated in the same fashion as the coefficients x and y for $Q_{ij}$ and $V^{MinD}$ respectively in the first embodiment at minimum system demand. The equations for $Q_{ij}$ and $V^{MinD}$ take the form described in the first embodiment.

Again, other orders of equations can be used for $P_{ij}$, $Q_{ij}$ and $V^{MinD}$ and a greater number of independent variables, for example, measured values for adjacent generators, could also be chosen to extend this technique. Equally, the expressions need not be continuously valued functions and could possibly be non-linear.

Thus the methodology of the first embodiment in formulating a current flow and reactive power flow estimation is adapted to determine the relationship between the new estimated parameter, active power flow, as it relates to the local active power injections of a generator and the local node voltage measurement at the generator at minimum system demand.

As before, to obtain tolerable estimations i.e. a sum of square of residuals and a root mean squared error of practically zero, a two-variable second order equation is fitted to data acquired at minimum system demand.

The new estimate for active power flow on a remote branch, $P_{ij}$, together with the estimation of reactive power flow of the remote branch, $Q_{ij}$, are used to estimate the complex power flow through the branch, $S_{ij}$, using the equation of complex power flow (16):

$$S_{ij}=\sqrt{P_{ij}^2+Q_{ij}^2} \quad (16)$$

Figure 8:
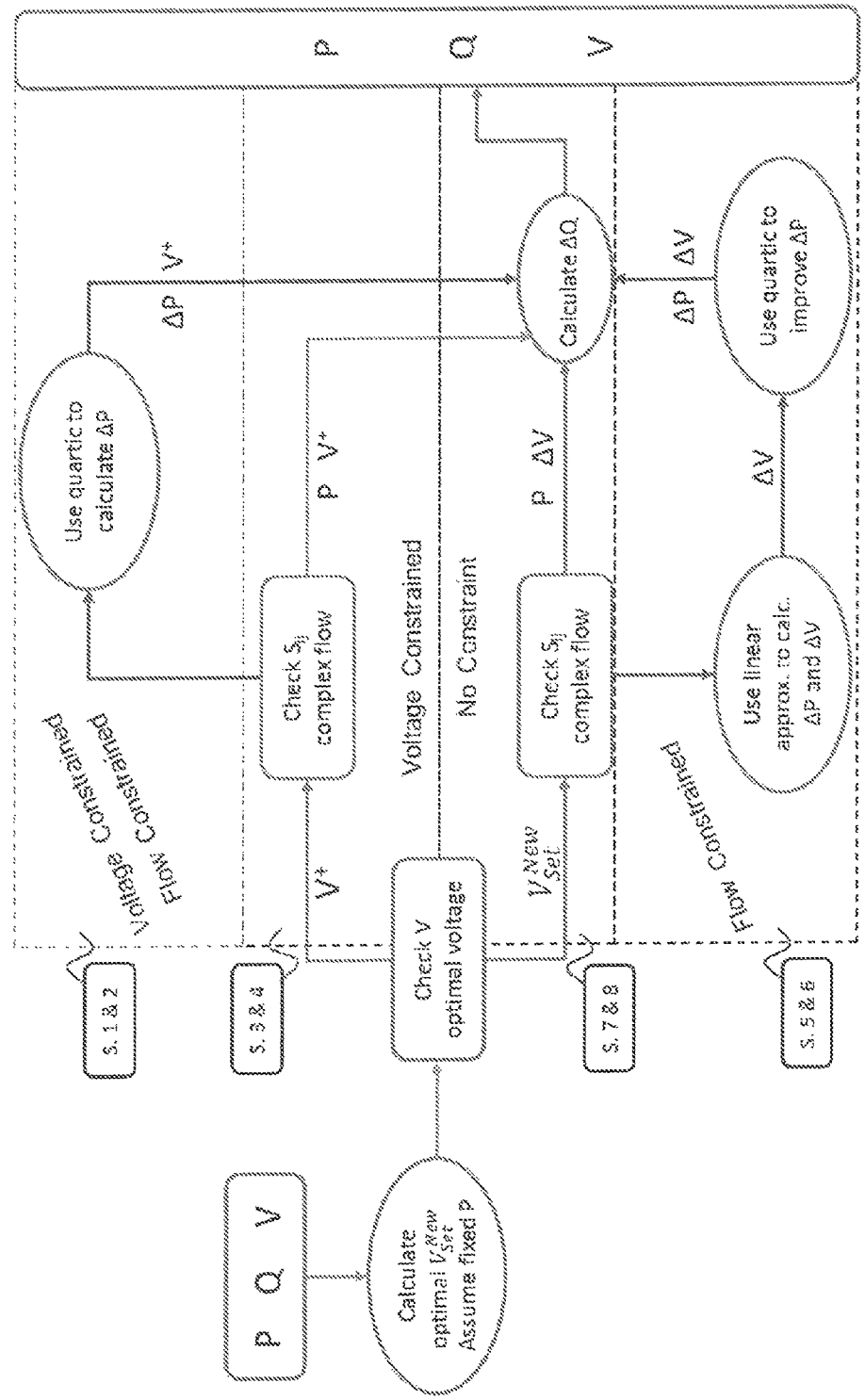
FIG. 8 illustrates a method for determining adjusted set points according to a second embodiment of the present invention.

Referring to FIG. 8, in the second embodiment, an optimal voltage set point is found by differentiating the formulation of active power flow, $P_{ij}$, with respect to voltage and setting this equation to zero. This estimates the point at which the formulation for the slope of the equation is zero, obtaining the optimal voltage set point to maximise the flow of active power. This set point, in maximising active power output of the remote branch will inherently result in the minimisation of reactive power along the branch in question.

First, the active power set point is assumed to be fixed initially. This allows $P_{ij}$ in equation (15) to be differentiated so as an optimal voltage for the node can be determined as in equation (17):

$$V_{Set}^{Old} = \frac{-w_4 - w_6 P}{2w_2} \quad (17)$$

As in FIG. 5 for the first embodiment, the formulation of voltage at minimum demand, $V^{MinD}$, is checked to adjust the optimal voltage set point $V_{Set}^{Old}$ and account for the presence of demand on the remote branch to provide $V_{Set}^{New}$.

At this stage, the optimal voltage set point $V_{Set}^{New}$ is assessed as to whether or not it falls within the allowable range of the local voltage constraint bounds. If not, the approach proceeds with the upper voltage limit $V^+$ as the target voltage set point rather than $V_{Set}^{New}$, knowing that this will cause a flow of reactive power on the remote branch and also cause an increase in active power loss.

Where there is a voltage constraint breach, a sub-optimal solution will be obtained for the maximum possible flow along the remote branch. The voltage constraint requires the use of local reactive power resources to manage the voltage at the upper limit $V^+$, (Scenarios 1-4).

In any case, the remote complex power flow is estimated for this voltage set point ($V_{Set}^{New}$ or $V^+$) and current active power set point P, as in equation (18) to determine if a complex power constraint $S_{ij}^+$ for the branch could be breached:

$$\sqrt{P_{ij}^2 + Q_{ij}^2} \leq S_{ij}^+ \tag{18}$$

This check can go one of two ways, either there is a complex flow constraint breach or not. In scenarios 1-4, if there is a constraint breach at this stage, it means that the flow of reactive power needed to support the local voltage constraint has caused the upper limit breach. This flow of reactive power is required and, as such, where there is a constraint breach (scenarios 1 and 2), the active power flow needs to be curtailed with a change ($\Delta P$). Or rather the combination of active power and reactive power of the generator should simultaneously manage both the flow of complex power and the voltage constraint, but priority needs to be given to the active power. The sub optimal solution still exists at the upper voltage limit, and the upper complex power bound is a known parameter $V^+$, which means in the formulation of (18), the only unknown is the active power generation that will satisfy this condition. Expanding (18), by squaring out both sides, setting the equation to equal the known complex power limit $S_{ij}^+$, and further expanding the square of the two quadratic formulations of active power, $P_{ij}$, and reactive power flow, $Q_{ij}$, gives the quartic expression (19):

$$(w_3)^2 P^4 + 2w_3(w_5 + w_6 V) P^3 + (2w_3(w_1 + w_2 V^2 + w_4 V) + (w_5 + w_6 V))P^2 + 2(w_5 + w_6 V)P + (w_1 + w_2 V^2 + w_4 V)^2 + (x_3)^2 P^4 + 2x_3(x_5 + x_6 V)P^3 + (2x_3(x_1 + x_2 V^2 + x_4 V) + (x_5 + x_6 V))P^2 + 2(x_5 + x_6 V)P + (x_1 + x_2 V^2 + x_4 V)^2 = (S_{ij}^+)^2 \tag{19}$$

Combining the coefficients gives a simplified expression for P, the required active power generation setting (20).

$$c_1 P^4 + c_2 P^3 + c_3 P^2 + c_4 P + c_5 = 0 \tag{20}$$

Solving for the roots of this equation gives three impossible answers (negative power or complex expressions) and one attainable/possible answer for the required active power setting for the node.

To determine the roots of (20), Lodovico Ferrari's technique (20.1-20.7) can be used, knowing the one possible solution to this problem is found by (20.1):

$$P = -\frac{c_2}{4c_1} - \frac{h_1}{2} + \frac{\sqrt{h_2 - h_3}}{2} \tag{20.1}$$

$$h_1 = \sqrt{\frac{(c_2)^2}{4(c_1)^2} - \frac{2c_3}{3c_1} + h_4} \tag{20.2}$$

$$h_2 = \frac{(c_2)^2}{2(c_1)^2} - \frac{2c_3}{3c_1} - h_4 \tag{20.3}$$

$$h_3 = \frac{-\frac{(c_2)^3}{(c_1)^3} + \frac{2c_2 c_3}{(c_1)^2} - \frac{8c_4}{c_1}}{4h_4} \tag{20.4}$$

$$h_4 = \frac{(c_3)^2 - 3c_2 c_4 + 12c_1 c_5}{3c_1 \left(\frac{h_5}{2}\right)^{\frac{1}{3}}} - \frac{\left(\frac{h_5}{2}\right)^{1/3}}{3c_1} \tag{20.5}$$

$$h_5 = h_6 + \sqrt{-4((c_3)^2 - 3c_2 c_4 + 12c_1 c_5)^3 + (h_6)^2} \tag{20.6}$$

$$h_6 = 2(c_3)^3 - 9c_2 c_3 c_4 + 27c_1 (c_4)^2 + 27(c_2)^2 c_5 - 72c_1 c_3 c_5 \tag{20.7}$$

The next calculation determines the new value for Q, the required reactive power setting of the generator that, together with the new value for P, will result in the voltage set point, in this case $V_{Set}^{New} = V^+$, at the node of generation. For this calculation, the coefficients $y_1 \ldots y_6$ and formulation for local voltage ($V^{MinD}$) as a function of active power and reactive power of the generator is used. This results in a quadratic expression in Q, with a known value of active power (P) and target voltage set point ($V_{Set}^{New}$) (21):

$$y_2 Q^2 + Q(y_4 + y_6 P) + y_5 P + y_1 + y_3 P^2 = V_{Set}^{New} \tag{21}$$

Solving for the roots of this equation gives the required new reactive power set point, Q, for the generator.

If, after assessing that there would be a voltage constraint and by checking (18) there is no constraint breach on the remote flow (Scenarios 3-4), then the procedure jumps straight to (21) where a change in value for reactive power $\Delta Q$ is determined.

In the event that there was no voltage constraint breach after determining the optimal voltage $V_{Set}^{New}$ (Scenarios 5-8) the procedure again checks for a complex flow constraint breach. Assuming there is no complex flow breach (Scenarios 7-8), then the change in value for reactive power $\Delta Q$ can again be found from (21).

If however, with no voltage constraint breach (Scenarios 5-6), the condition of (18) cannot be satisfied then active power is required to be curtailed by $\Delta P$. Note that the voltage set point $V_{Set}^{Old}$ obtained from equations (15, 17) is only optimal for the case where the active power generation is assumed fixed and does not to cause a breach in remote complex power flow. When this is not the case, equation (15) now has two unknown variables P and V and so in isolation cannot be used to determine both optimal set points. Another equation is required to condition the problem as two equations and two unknowns. Given that the sole constraint is the complex power flow along a remote branch, the solution ensures that only active power is flowing on this branch. Therefore the complex flow limit ($S_{ij}^+$) can be equated to active power flow ($P_{ij}$) as per equation (22). Also the reactive power in this branch, as always, should be ideally zero to maximise the active power export as per equation (23):

$$P_{ij} \rightarrow w_1 + w_2 V^2 + w_3 P^2 + w_4 V + w_5 P + w_6 VP = S_{ij}^+ \tag{22}$$

$$Q_{ij} \rightarrow x_1 + x_2 V^2 + x_3 P^2 + x_4 V + x_5 P + x_6 VP = 0 \tag{23}$$

This gives the two conditions (22, 23) required to satisfy the complex flow constraint. These estimations for active power and reactive power flow can be simplified as first order equations, as per equations (24) and (25). This requires the procedure of FIG. 2 to be repeated to relate a first order equation with two independent variables to the flow of active power and reactive power on a remote line.

$$P_{ij} \rightarrow e_1 + e_2 V + e_3 P = S_{ij}^+ \tag{24}$$

$$Q_{ij} \rightarrow f_1 + f_2 V + f_3 P = 0 \tag{25}$$

Solving for the voltage and active power in this set of equations gives the amount of voltage curtailment (ΔV) needed to satisfy the flow constraint on the remote branch. We can then use the curtailed voltage set point as the known parameter in equations (19, 20) to determine a curtailment in active power (ΔP) and then with these new values for voltage and active power, determine a new setting for reactive power using equation (21). In doing so, the optimal reactive power and voltage set point with minimal curtailment to the active power generation is found.

Again, in FIG. 8, the labels denoted S. 1-8 relate the regions in the flow chart back to the scenarios identified in FIG. 7 and discussed above. In the second embodiment, a target voltage $V_{Set}^{New}$ for the maximisation of active power flow is calculated. The target voltage is checked to be within tolerable bounds and that the resultant estimate for complex power flow $S_{ij}$ is within tolerable bounds. In some scenarios, a curtailment in active power ΔP to obtain this optimal voltage may be required. Finally, an alternate approach vis-à-vis the first embodiment is used to calculate a required change in reactive power ΔQ.

When operating within the thermal limit of the target branch, the first and second embodiments produce the same results. The first embodiment minimises the content of reactive power in a target branch, while the second embodiment maximises the content of active power in a target branch which results in minimal reactive power flow. However the formulation of active power flow gives rise to the estimation of complex power flow, using the estimates for active power flow and reactive power flow. All branches have a known complex power limit, thus the second embodiment identifies if that upper limit is breached and calculates the changes in reactive power as well as active power required to avoid such a breach.

The estimation for current flow on a remote branch in the first embodiment is imprecise, typically giving an error of about 5%. In contrast, this new estimate for complex power flow employed in the second embodiment, being conservative, gives an error of about 0.05%.

For either embodiment, the controller can be implemented in software for example on a programmable logic controller (PLC) device with limited computational ability which is installed at a generator substation and interfaced to an existing generator control system. Prior to operation, the remote section/s of network which is/are to be assigned to the generator is/are established and the controller is programmed with the vectors x, y and z of equations (8) to (10) for the first embodiment or vectors x, y and w from equations (15), (17), (19) and (21)-(23) for the second embodiment. The input measurement set is obtained from local instrument transformers, which are readily available at the generator substation. Once in operation, the controller issues an updated reactive power set point and, possibly in the second embodiment, an active power set point for the generator at given intervals. It is of course possible for the controller to update more or less frequently or at irregular intervals.

In the first embodiment, in the event that a change in the topology of the network occurs, and/or a generator or load is added to or removed from the network, the network needs to be remodelled, i.e. FIG. 2 or step 1 of FIG. 4 need to be repeated, and the controller software updated accordingly to take account the new network characteristics. In other embodiments, the controller could be arranged to sense a change in topology and to react accordingly.

The advantage in operating distributed generators in the manner described above is the assurance that the generated active power is added as efficiently as possible to the surrounding network. This is typically reflected in an improvement in system losses over the course of operation of the method.

This invention is applicable to any generator, especially a renewable power generator that has the ability to control the injection and absorption of reactive power. Embodiments of the invention can be applied to regions of a transmission system with high reactive power voltage sensitivities and reactive power voltage angle sensitivities.

The invention claimed is:

1. A method for controlling power distribution through an electrical network comprising:
 a) modelling the network to:
    relate current flow ($|I_{ij}|$, $Q_{ij}$) in at least one designated branch connecting a pair of nodes (ij) of the network to a combination of measured voltage and power being injected at a node i of the network to which a device that injects and absorbs reactive power is connected;
    relate an expected voltage ($V^{MinD}$) at the node i at a given level of network demand to a combination of active and reactive power being injected by said device at said node i;
    relate reactive power to voltage sensitivity $$\frac{\partial Q}{(\partial V)}$$

at the node i to a combination of voltage and power being injected at the node i;
 b) measuring voltage (V), and injected reactive power (Q) and active power (P) at the node i;
 c) calculating a desired set voltage ($V_{Set}^{Old}$) at said node i which minimizes current flow in said designated branch as a function of said measured voltage, reactive power, active power injected at the node i and coefficients determined from regression analysis of said network;
 d) calculating said expected voltage based on said injected reactive and active power;
 e) calculating an adjusted desired set voltage ($V_{Set}^{New}$) based on said expected voltage;
 f) determining a required adjustment of said device's voltage set point ($\Delta V_{New}$) based on a difference between said adjusted desired set voltage and said measured voltage;
 g) calculating a reactive power to voltage sensitivity $$\frac{\partial Q}{(\partial V)}$$

based on measured voltage and power injected at the node i;
 h) calculating a required change (ΔQ) to said device's reactive power setting as a function of said adjusted desired set voltage and said reactive power to voltage sensitivity; and
 i) communicating said required change to said device to cause said device to make said required change to said device's reactive power setting.

2. A method according to claim 1 wherein said relationship between current flow ($|I_{ij}|$, $Q_{ij}$) and measured voltage and power injected at the node i is defined as:

$|I_{ij}|$ or $Q_{ij} = x_1 + x_2 V^2 + x_3 P^2 + x_4 V + x_5 P + x_6 PV$ where $x_1 \ldots x_6$, are scalar coefficients.

3. A method according to claim 1 wherein said relationship between expected voltage ($V^{MinD}$) at the node i at a given level of network demand to a combination of active and reactive power being injected by said device is defined as:

$V^{MinD} = y_1 + y_2 Q^2 + y_3 P^2 + y_4 Q + y_5 P + y_6 PQ$ where $y_1 \ldots y_6$, are scalar coefficients.

4. A method according to claim 1 wherein said relationship between reactive power to voltage sensitivity $$\frac{\partial Q}{(\partial V)}$$

and voltage and injected power at the node i is defined as:

$$\frac{\partial Q}{\partial V} = z_1 + z_2 V^2 + z_3 Q^2 + z_4 V + z_5 Q + z_6 QV$$

where $z_1 \ldots z_6$, are scalar coefficients.

5. A method according to claim 1 wherein said given level of network demand is minimum network demand.

6. A method according to claim 5 wherein said minimum network demand comprises either: zero demand; or an estimate of demand at each of a number of nodes of said network.

7. A method according to claim 1 comprising performing b) to i) iteratively.

8. A method according to claim 7 wherein b) to i) are performed periodically.

9. A method according to claim 1 comprising performing a) in response to a change in network configuration.

10. A method according to claim 1 wherein said adjustment of said device's voltage set point ($\Delta V_{New}$) is limited to permitted bounds.

11. A method according to claim 1 wherein said required change ($\Delta Q$) to said device's reactive power setting is limited to permitted bounds.

12. A method according to claim 1 wherein said modelling comprises:
performing power flow analysis of said network for all possible active and reactive power operating points of all devices connected to said network at a given level of system demand; and performing said regression analysis of said power flow analysis results to determine said relationships.

13. A method according to claim 12 wherein said power flow analysis results comprise a Jacobian matrix of the form:

$$\begin{bmatrix} \Delta P_1 \\ \Delta Q_1 \\ \vdots \\ \Delta P_i \\ \Delta Q_i \end{bmatrix} = \begin{bmatrix} \frac{\partial P_1}{\partial \theta_1} & \frac{\partial P_1}{\partial V_1} & \cdots \\ \frac{\partial Q_1}{\partial \theta_1} & \frac{\partial Q_1}{\partial V_1} & \cdots \\ \vdots & \vdots & \vdots \end{bmatrix} \cdot \begin{bmatrix} \Delta \theta_1 \\ \Delta V_1 \\ \vdots \\ \Delta \theta_j \\ \Delta V_j \end{bmatrix}$$

where:
$\theta$ comprises voltage phasor angle at a node i;
V comprises voltage phasor magnitude at a node i;

$$\frac{\partial P}{\partial V}$$

comprises active power voltage sensitivity at a node i;

$$\frac{\partial Q}{\partial V}$$

comprises reactive power voltage sensitivity at a node i;

$$\frac{\partial P}{\partial \theta}$$

comprises active power voltage angle sensitivity at a node i;

$$\frac{\partial Q}{\partial \theta}$$

comprises reactive power voltage angle sensitivity at a node i.

14. A method according to claim 1 performed locally at a device independently of other devices in said network.

15. A method according to claim 1 performed centrally for all devices of said network.

16. A method according to claim 1 wherein said device is a power generator.

17. A controller configured to connect to at least one device that injects and absorbs reactive power in an electricity distribution network, the controller being configured to perform a)-i) of claim 1.

18. A computer program product comprising a non-transitory computer readable medium on which computer executable instructions are stored and which when executed on a controller in an electricity distribution network are arranged to perform a)-i) of claim 1.

19. A method for controlling power distribution through an electrical network comprising:
a) modelling the network to:
relate active and reactive power flow ($P_{ij}$, $Q_{ij}$) respectively in at least one designated branch connecting a pair of nodes (ij) of the network to a combination of measured voltage (V) and active power (P) being injected at a node i of the network to which a device that injects and absorbs reactive power is connected;
relate an expected voltage ($V_{MinD}$) at the node i at a given level of network demand to a combination of active (Q) and reactive power (P) being injected by said device at said node i;
b) measuring voltage (V), and injected reactive power (Q) and active power (P) at the node i;
c) calculating a desired set voltage ($V_{Set}^{Old}$) at said node i which maximizes active power flow (P) in said designated branch as a function of said measured voltage, active power injected at the node i and coefficients determined from regression analysis of said network;
d) calculating said expected voltage ($V^{MinD}$) as a function of said injected reactive (Q), active (P) power and coefficients determined from regression analysis of said network;

e) calculating an adjusted desired set voltage ($V_{Set}^{New}$) based on said expected voltage;

f) determining a required adjustment of said device's voltage set point ($\Delta V$) based on a difference between said adjusted desired set voltage and said measured voltage;

g) checking a complex power constraint ($S_{ij}^+$) for said designated branch as a function of said injected power (P) and said adjusted desired set voltage ($\Delta V$) to determine a possible required change to said device's active power setting ($\Delta P$);

h) calculating a required change ($\Delta Q$) to said device's reactive power setting as a function of said adjusted desired set voltage and said device's active power setting;

and i) communicating said required change to said active power setting or said reactive power setting to said device to cause said device to make said required change to said device's active or reactive power setting.

20. A method according to claim 19 comprising: prior to checking said complex power constraint, checking if said adjusted desired set voltage ($V_{Set}^{New}$) breaches an upper voltage constraint ($V^+$) for said node and limiting the adjustment of said desired set voltage accordingly.

21. A method according to claim 20 comprising determining said device's active power setting (P) using the following equality:

$$(w_3)^2P^4+2w_3(w_5+w_6V)P^3+(2w_3(w_1+w_2V^2+w_4V)+(w_5+w_6V))P^2+2(w_5+w_6V)P+(w_1+w_2V^2+w_4V)^2+(x_3)^2P^4+2x_3(x_5+x_6V)P^3+(2x_3(x_1+x_2V^2+x_4V)+(x_5+x_6V))P^2+2(x_5+x_6V)P+(x_1+x_2V^2+x_4V)^2=(S_{ij}^+)^2$$

where V is said adjusted desired set voltage, and $w_1 \ldots w_6$ and $x_1 \ldots x_6$ are sets of coefficients relating active and reactive power flow ($P_{ij}$, $Q_{ij}$) respectively in said at least one designated branch to a combination of voltage (V) and active power (P) being injected at a node i.

22. A method according to claim 21 comprising determining said device's reactive power setting (Q) using the following equality:

$$y_2Q^2+Q(y_4+y_6P)+y_5P+y_1+y_3P^2=V_{Set}^{New}$$

where $y_1 \ldots y_6$ are a set of coefficients relating expected voltage ($V^{MinD}$) at the node i at a given level of network demand to a combination of active (Q) and reactive power (P) being injected by said device at said node i.

23. A method according to claim 20, comprising: responsive to said adjusted desired set voltage ($V_{Set}^{New}$) not breaching an upper voltage constraint ($V^+$) for said node but said adjusted desired set voltage ($V_{Set}^{New}$) and said injected power setting (P) breaching said complex power constraint ($S_{ij}^+$) for said designated branch:

curtailing said set voltage by determining a voltage setting ($\Delta V$) where active power flow ($P_{ij}$) in said designated branch is set to the complex flow limit ($S_{ij}^+$) and based on no reactive power ($Q_{ij}$) flowing in said designated branch;

calculating a curtailment of said active power setting ($\Delta P$) based on said curtailed set voltage; and calculating a reactive power setting $\Delta Q$ based on said curtailed set voltage and said curtailed active power setting.

24. A controller configured to connect to at least one device that injects and absorbs reactive power in an electricity distribution network, the controller being configured to perform a)-i) of claim 19.

25. A computer program product comprising a non-transitory computer readable medium on which computer executable instructions are stored and which when executed on a controller in an electricity distribution network are arranged to perform a)-i) of claim 19.

* * * * *